(No Model.)

L. W. SERRELL & H. L. LUFKIN.
REGULATION OF ELECTRIC MOTORS.

No. 420,469. Patented Feb. 4, 1890.

Witnesses: Charles W. Field, John J. Finney

Inventors: Lemuel W. Serrell, Harvey L. Lufkin

UNITED STATES PATENT OFFICE.

LEMUEL W. SERRELL, OF PLAINFIELD, NEW JERSEY, AND HARVEY L. LUFKIN, OF NEW YORK, N. Y.

REGULATION OF ELECTRIC MOTORS.

SPECIFICATION forming part of Letters Patent No. 420,469, dated February 4, 1890.

Application filed May 8, 1888. Serial No. 273,226. (No model.)

*To all whom it may concern:*

Be it known that we, LEMUEL W. SERRELL, residing at Plainfield, county of Union, State of New Jersey, and HARVEY L. LUFKIN, residing at New York, in the county and State of New York, have invented certain new and useful Improvements in Electric Motors, of which the following is a full, clear, and exact specification.

Our invention relates to electric motors, and has for its object to provide an electric motor which is adapted to be used in constant-current circuits, and which shall be self-regulating and run at practically a constant speed under all variations of load or work to be performed, and which shall be saving of potential under all stages of the development of its powers and practically unform in efficiency; and our invention consists in the general arrangement of circuits and devices, substantially as hereinafter described, whereby these ends are attained.

In the accompanying drawings we have illustrated the principles of our invention diagrammatically, and it may be carried out in practice by the use of any well-known devices which are adapted to be used as indicated, and which will readily suggest themselves to those skilled in the art.

Figure 1:
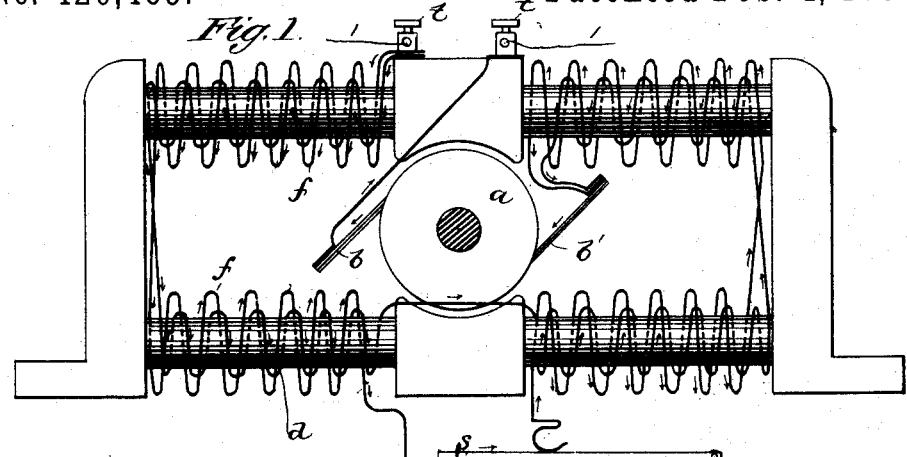
Figure 2:
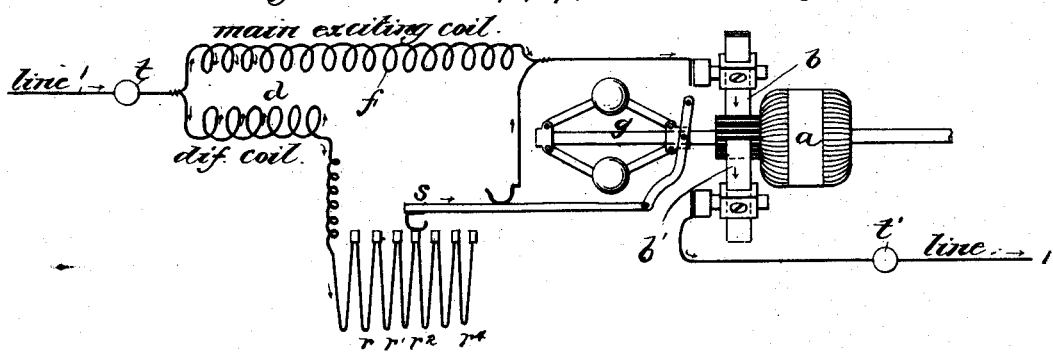
Figure 3:
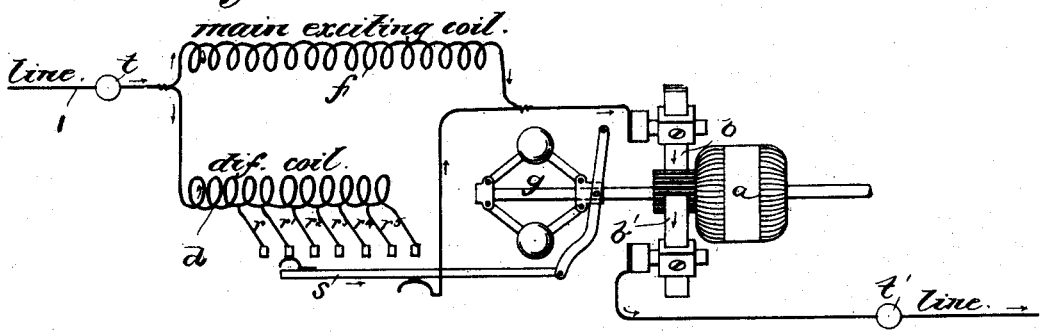

Figure 1 shows the variable resistance interposed in the differential circuit midway between the terminals thereof. Fig. 2 shows the variable resistance interposed in the differential circuit between the coils and armature, and Fig. 3 shows an arrangement for cutting out the coils of the differential circuit.

Heretofore the usual way of controlling the power and speed of electric motors used in series or constant-current circuits has been to connect in multiple arc with them the shunt or variable-resistance circuit around the motor, or to throw into and out of circuit more or less of the field-magnet coils. It has also been proposed in compound-wound-arc motors to make use of a demagnetizing field-circuit of comparatively high resistance, forming a shunt across the terminals of the motor, including a variable resistance controlled by a regulating-magnet arranged in or governed by the armatured or field circuit of the motor.

It is obvious that when electric motors are used in series circuit with other motors or translating devices it is desirable that when running free the motor should offer the least possible resistance to the passage of the current, and as the load increases it is desirable to increase the power of the motor and to diminish ineffective or dead resistance to the greatest extent and to cause the motor to operate with a practically-uniform efficiency from slight load to full load.

Referring to the drawings, 1 represents the main line, and $t\ t'$ the terminals of the motor.

$a$ represents the armature, and $b\ b'$ the brushes thereof.

$f$ is the main field-magnet or exciting-circuit, and $d$ is the differential field-magnet or demagnetizing-circuit.

$r\ r'\ r^2$, &c., are a series of resistances in or loops of the differential coil.

$s$ represents a suitable switch for cutting in or out more or less of the coils $r$, and $g$ is a governor of any suitable construction, being shown as a ball-governor, which controls the switch.

The differential circuit is of such character as to be of very low resistance relatively to the resistance of the main energizing-circuit, and even when all the coils of the variable resistance are included in the circuit the resistance is as low as possible, and in this way we are enabled to make the internal resistance of the motor very low, especially when working under a light load, and under these conditions, when the motor is running free, the resistance of the motor is at a minimum, as the current has two paths across the field open to it, and gradually as the load is superimposed one of these paths— that is, through the differential coil—becomes more and more closed to the passage of the current, until when the motor is running under its maximum load practically all of the current flows through the main exciting-coil and armature. This will be better understood when it is considered that theoretically the number of volts generated in the armature depends upon the number of lines of force cut per unit of time by the ampère-turns of wire in the armature, and the ampères in the armature are assumed to be constant, while the number of turns or convolutions of wire upon the armature and its speed of rotation are also constant, and the regulation is, therefore, dependent upon the variations in the magnetic strength of the field, and this is done by automatically varying the current flowing through the differential or demagnetizing circuit by means of the governor and switching devices for including more or less of the resistances or loops in the differential circuit. In this way the regulation is effected by automatically varying the resistance in the differential field-circuit, so that the resultant magnetic moment of the field shall be proportional to the load upon or the work done by the armature. We have found this arrangement exceedingly simple, delicate, and effective, permitting all the advantages of a series-wound motor and still obtaining practically perfect regulation.

What we claim as our invention, and desire to secure by Letters Patent, is—

1. The combination, with the main exciting-coil of an electric motor, of a differential coil in parallel with the main exciting-coil, both coils being in series with the armature, and a speed-governor controlled by the motor and controlling the current flowing through the differential coil in accordance with the work done, substantially as described.

2. The combination, with the main exciting-coil of an electric motor, of a differential coil in parallel with the main exciting-coil, which differential coil is connected in series circuit with variable-resistance devices, and both coils are connected in series with the armature, and a speed-governor for controlling the action of the variable resistance in accordance with the work done, substantially as described.

3. The combination, with a series-wound electric motor having a differential coil in parallel with the main field exciting-coil and both coils in series with the armature, of a variable resistance in the differential circuit, a speed-governor controlling the variable resistance, so that as the speed of the motor unduly increases less and less resistance shall be offered to the passage of the current through the differential coil, and as the speed of the motor unduly diminishes more and more resistance shall be offered to the passage of the current through the differential coil, substantially as described.

In testimony whereof we have signed our names to this specification in the presence of two subscribing witnesses.

LEMUEL W. SERRELL.
HARVEY L. LUFKIN.

Witnesses:
CHARLES W. GOULD,
ALBERT T. MOORE.